Jan. 26, 1937. J. KNELL 2,068,988
OUTLET BOX
Filed Dec. 12, 1931
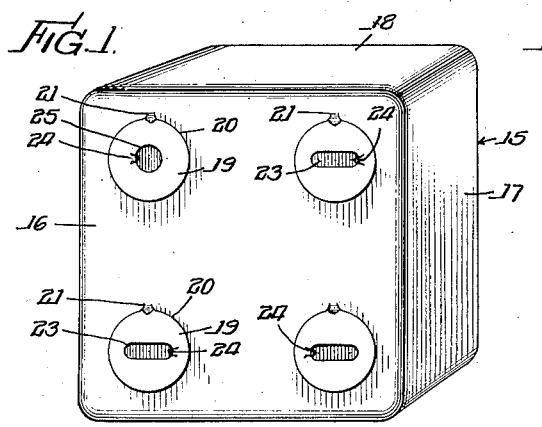
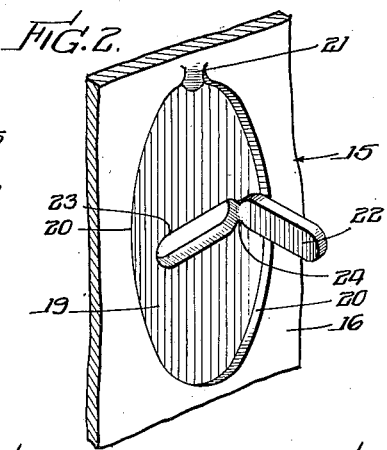
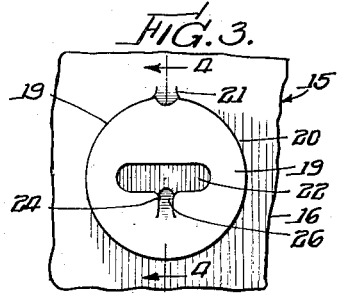
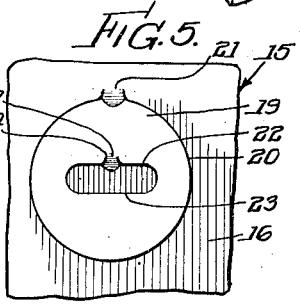
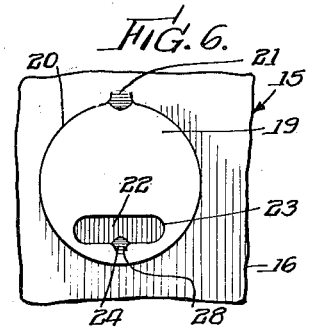
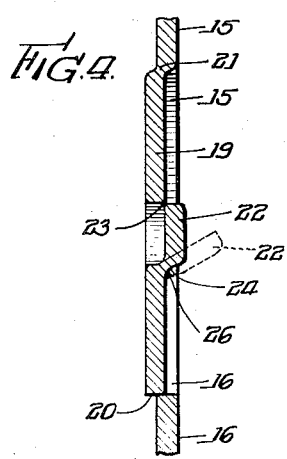
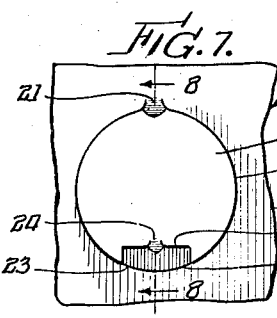
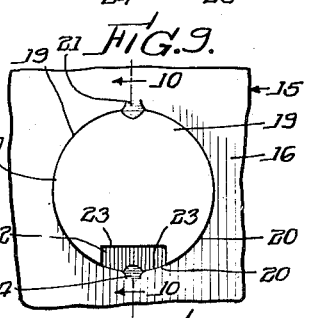
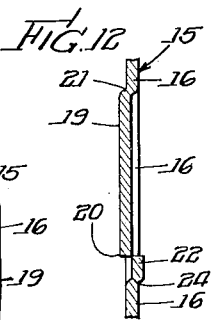
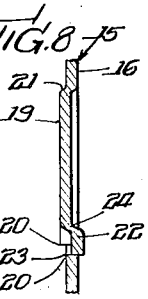
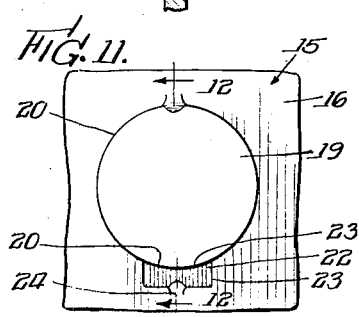
Inventor:
John Knell,
By Cheever, Cox & Moore
attys Patented Jan. 26, 1937

2,068,988

UNITED STATES PATENT OFFICE 2,068,988

OUTLET BOX

John Knell, Aurora, Ill., assignor to All-Steel-Equip Company, Aurora, Ill., a corporation of Illinois Application December 12, 1931, Serial No. 580,519

2 Claims. (Cl. 247—26)

This invention relates in general to electrical enclosing boxes and particularly to electric switch boxes and outlet boxes. More specifically, the invention relates to knock-outs for outlet boxes.

The primary object of the invention is to provide a new and improved knock-out for electrical enclosing boxes, such as outlet boxes, there being an auxiliary knock-out provided in either the main knock-out or the box, the auxiliary knock-out being constructed and arranged to permit easy and instant displacement thereof such as by punching with a screw-driver, thereby providing a hole or opening through the main knock-out into which a tool, such as a screw-driver, may be inserted for prying and twisting out the main knock-out.

Another object of the invention is to provide a knock-out with an auxiliary knock-out which is depressed or embossed below the normal surface of the main knock-out, the main knock-out being raised above the normal face of the body of the box.

Another object of the invention is to provide an outlet box having a main knock-out and an auxiliary knock-out, the main knock-out being preferably defined by a cut made entirely through the material of the outlet box or by a partial perforation, the cut or perforation being interrupted by a single tongue or intact portion integrally connecting the knock-out to the outlet box; the auxiliary knock-out also being defined by a cut extending entirely through the material or by a partial perforation, the cut or perforation being interrupted by a single tongue or intact portion integrally connecting the auxiliary knock-out to the body of either the main knock-out or the box.

Another object of the invention is to provide an outlet box which is thoroughly enclosed without the provision of any openings therein by the formation of main knock-outs and auxiliary knock-outs which are employed only as necessity arises, the auxiliary knock-outs being so constructed and arranged that they may be readily and instantly removed, such as by punching, to provide means for prying out the main knock-outs, the auxiliary knock-outs being removed or knocked out only when the co-operating or companion main knock-outs are to be removed for the reception of a cable or conduit.

A still further object is to provide an outlet box having a line of rupture which is interrupted by a single fin, intact, or tongue for integrally holding the knock-out to the metal material of the box in combination with an auxiliary knock-out having a line of rupture which is interrupted by a single intact, fin, or tongue for integrally holding the auxiliary knock-out to the metal material of the main knock-out whereby a completely inclosed box is provided allowing instant displacement of the auxiliary knock-out to permit removal of the main knock-out by the use of a prying tool, such as a screw-driver, for prying out the main knock-out.

Still another object is to provide an outlet box with a knock-out, the knock-out being provided with an auxiliary knock-out so situated and arranged relative to the integral connecting tongue of the knockout as to permit easy breaking off of the tongue by a prying action after the auxiliary knock-out has been dislodged or displaced.

Numerous other objects and advantages will be apparent throughout the progress of the following specification.

The accompanying drawing illustrates a selected embodiment of the invention and the views therein are as follows:

Fig. 1 is a detail perspective view of an outlet box provided with the improved pry-out or knock-out construction.

Fig. 2 is a detail enlarged rear view showing the manner in which the auxiliary knock-out is dislodged or displaced so that a tool may be effectively used in entirely dislocating the main knock-out from the wall of the box.

Fig. 3 is a detail elevation showing the auxiliary knock-out arranged substantially in the center of the knock-out but having its connecting fin or intact located at the bottom of the auxiliary knock-out.

Fig. 4 is a detail sectional view on the line 4—4 of Fig. 3.

Fig. 5 is a detail elevation similar to Fig. 3 but showing the auxiliary knock-out, fin, or intact at the upper end of the auxiliary knock-out.

Fig. 6 is a detail elevation similar to Fig. 3 but showing the auxiliary knock-out located a substantial distance below the normal center of the main knock-out.

Fig. 7 is a detail elevation showing a part of the cut or perforation of the main knock-out forming a part of the cut or perforation of the auxiliary, the connecting tongue being mounted at the upper end of the auxiliary knock-out.

Fig. 8 is a detail sectional view on the line 8—8 of Fig. 7.

Fig. 9 is a detail elevation similar to Fig. 8 but showing the auxiliary tongue arranged at the lower end of the auxiliary knock-out and integrally connected to the outlet box.

Fig. 10 is a detail sectional view on the line 10—10 of Fig. 9.

Fig. 11 is a detail elevation of an auxiliary knock-out provided in the box adjacent the line of cut or rupture of the main knock-out.

Fig. 12 is a detail sectional view on the line 12—12 of Fig. 11.

The particular box herein shown comprises the usual sheet metal casing 15 which may be made of any conventional shape and which comprises the usual bottom wall 16 and side and end walls 17 and 18 respectively. The outlet box is provided with knock-outs 19 which have a line of rupture 20 formed by embossing or cutting. The knock-outs may be made normally flush with the surface of the box but it is desirable that they be raised and be parallel with the body of the box as shown in the various figures. The drawing herein shows the knock-outs formed in the bottom of the box but it is understood, of course, that the knock-outs may be formed in the sides, ends, or top of the box as is usual and as circumstances may require, the various figures merely illustrating how the knock-outs may be formed in a sheet metal box regardless of their position. The knock-outs 19 are preferably integrally connected to the body of the outlet box by one or more fins or tongues 21. Auxiliary knock-outs 22 may be formed within the boundary of the knock-outs 19, Figs. 1 to 8, and may be located substantially centrally of the main knock-outs 19 as shown in Figs. 1 to 5.

These auxiliary knock-outs 22 have a line of rupture 23 formed by embossing or cutting. The auxiliary knock-outs may be made normally flush with the surface of the main knock-out 19 but it is desirable that they be countersunk or depressed and be parallel with the body of the main knock-out. The auxiliary knock-outs 22 are preferably integrally connected to the body of the main knock-out 19 by one or more fins or tongues 24.

The auxiliary knock-outs 22 may be of any shape desired but are preferably made elongated having parallel sides and rounded ends for the reception of a prying tool, such as a screw-driver. However, they may be completely circular as indicated at 25 in Fig. 1 for the reception of a prying tool, such as an awl, a nail, or a small sized drift pin. In Figs. 1 and 2 the intact or tongue 24 is shown at the side of the auxiliary knock-out, but the fin may be situated relative to the auxiliary knock-out in any place desirable. In Fig. 3 the intact or fin is shown at the bottom edge of the auxiliary knock-out as indicated at 26, Figs. 3 and 4. In Fig. 5 the fin is located at the upper edge of the auxiliary knock-out as indicated at 27.

The auxiliary knock-out is positioned below the normal center line of the main knock-out and has its fin 24 arranged at the lower edge of the auxiliary knock-out as indicated at 28. The construction shown in Fig. 6 is practically the same as that shown in Figs. 3 and 4 except the knock-out is somewhat lowered. However, in all instances it is desirable that the auxiliary knock-outs 22 be remotely situated from the main knock-out fin or tongue 21 and not be contiguous to the main knock-out tongue or intact.

In Figs. 7 to 10 the auxiliary knock-out 22 is positioned so that part of the cut 23 of the auxiliary knock-out is co-extensive with the cut 20 of the main knock-out. However, two separate cuts are not required, the main cut 20 of the main knock-out providing a part of the cut 23 of the auxiliary knock-out. The knock-outs shown in Figs. 7 and 8 are substantially the same as the knock-outs shown in Figs. 9 and 10 except the auxiliary intact or fin 24 connects the auxiliary knock-outs with the bodies of the main knock-outs in Figs. 7 and 8, while the auxiliary knock-outs 24 shown in Figs. 9 and 10 connect the auxiliary knock-outs 22 integrally with the metal material of the box.

In Figs. 11 and 12 the auxiliary knock-outs are positioned entirely outside of the boundaries of the knock-outs 19. The auxiliary knock-out 22 shown in Fig. 11 is partially depressed into the face of the box, while the main knock-out 19 is raised a slight distance above the face of the box. The auxiliary knock-outs 22, Figs. 11 and 12, have their tongues or fins 24 integrally connecting the auxiliary knock-outs to the boxes.

Regardless of the shape of the auxiliary knock-out or its position relative to the main knock-out it is desirable that the auxiliary knock-out be depressed and positioned downwardly with respect to the main knock-out, while the main knock-out be raised or extended above the normal face of the outlet box. The construction, therefore, provides an auxiliary knock-out which is truly a knock-out in that it is punched or pushed inwardly, while the main knock-out is in reality a twist-off or pry-out in that it is adapted to be pried loose from the wall of the box by a tool after the auxiliary knock-out has first been displaced or dislodged by driving the auxiliary knock-out inwardly.

In actual practice it has been found desirable to position the auxiliary knock-out a substantial distance from the main knock-out connecting fin and not have it contiguous to the fin so as to obtain greater leverage for twisting or prying off the main knock-out. Furthermore, the remote position of the auxiliary knock-out relative to the main knock-out connecting fin permits the main knock-out to be removed and dislodged more readily without as great an effort.

The invention provides a knock-out within a knock-out permitting the outlet box to be made with the convenient knock-outs without providing any holes through the box, thereby overcoming objections from the fire underwriters as well as preventing any sparking or flashing which may occur in the box from passing through excess openings which are not required and which certainly are not desirable. The box is entirely enclosed, there being no excess openings and the removal of the knock-outs is instant and easily done. In removing a knock-out, a screw-driver or other implement is inserted in the depression formed by the auxiliary knock-out and then the screw-driver is either pushed manually or struck a light blow with a hammer to dislodge the auxiliary knock-out so as to form an opening entirely through the wall to receive the end of a screw-driver for the purpose of twisting off the main knock-out. If desirable, the main knock-out can be broken from the box by grasping hold of the auxiliary knock-out with a pair of pliers after the auxiliary knock-out has been dislodged and then twisting the main knock-out loose by breaking the intact or fin.

The term "knock-out" used herein is to be given its broadest interpretation and does not restrict the invention to the actual knocking out of the knock-out by a blow, but is to be given the interpretation that the portion may be twisted off, pried out, or removed in any manner desirable or practicable.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In electric protective means having a pry-out formed in a wall thereof, said pry-out having its outer surface raised above the outer surface of said wall and being defined by a line of rupture interrupted by a single integral tongue which connects the pry-out to the wall, and a knock-out arranged totally within said line of rupture and having its outer surface lower than the outer surface of said pry-out, said knock-out being defined by a single line of rupture interrupted by a single integral tongue which connects the knock-out to the pry-out, the line of rupture of the knock-out being remotely situated from the pry-out tongue, said knock-out adapted to be dislodged from the pry-out to provide an opening through the pry-out for the reception of an implement for prying out and twisting off the pry-out.

2. In electric protective means, a casing having a wall, a pry-out in said wall, said pry-out being connected to the wall by means of a single tongue integral with the pry-out and the wall which tongue constitutes the only means of conection with the wall, a knock-out disposed within the pry-out and connected therewith by a tongue integral with the knock-out and pry-out, said two tongues being separate and distinct and said knock-out being remotely situated with respect to the first named tongue whereby to increase the leverage exertable thereon by a pry-out removing tool insertable within the knock-out opening.

JOHN KNELL.